United States Patent
Chen et al.

(10) Patent No.: US 11,783,621 B2
(45) Date of Patent: Oct. 10, 2023

(54) OPTICAL FINGERPRINT IMAGING DEVICE

(71) Applicant: Gingy Technology Inc., Hsinchu (TW)

(72) Inventors: Ping-Chen Chen, Hsinchu (TW); Mon-Nan Ho, Hsinchu (TW); Chuan Min Lee, Hsinchu (TW); Chung Hao Tseng, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 0 days.

(21) Appl. No.: 17/989,693

(22) Filed: Nov. 18, 2022

(65) Prior Publication Data

US 2023/0162527 A1 May 25, 2023

Related U.S. Application Data

(60) Provisional application No. 63/281,092, filed on Nov. 19, 2021.

(51) Int. Cl.
| | | |
|---|---|---|
| *G06V 40/13* | (2022.01) | |
| *H04N 23/55* | (2023.01) | |
| *G06V 10/147* | (2022.01) | |

(52) U.S. Cl.
CPC ........ *G06V 40/1324* (2022.01); *G06V 10/147* (2022.01); *H04N 23/55* (2023.01)

(58) Field of Classification Search
CPC ... G06V 40/1324; G06V 10/147; H04N 23/55
See application file for complete search history.

(56) References Cited

U.S. PATENT DOCUMENTS

| | | | |
|---|---|---|---|
| 10,699,098 B2 | 6/2020 | Chen et al. | |
| 2018/0005003 A1* | 1/2018 | Ryu | G06V 40/1324 |
| 2018/0349673 A1* | 12/2018 | Lin | G06V 40/1318 |

FOREIGN PATENT DOCUMENTS

| | | |
|---|---|---|
| EP | 1830123 | 4/2012 |
| TW | M498326 | 4/2015 |
| TW | I552091 | 10/2016 |
| TW | 566156 | 1/2017 |
| TW | M612452 | 5/2021 |
| TW | M617394 | 9/2021 |

OTHER PUBLICATIONS

"Office Action of Taiwan Counterpart Application", dated May 24, 2023, pp. 1-4.

* cited by examiner

*Primary Examiner* — Abhishek Sarma
(74) *Attorney, Agent, or Firm* — JCIPRNET

(57) ABSTRACT

An optical fingerprint imaging device, including a substrate, an imaging module, at least one light emitting element, a light shielding element, a case, and a pressing substrate, is provided. The light shielding element is disposed between the imaging module and the light emitting element. The optical fingerprint imaging device satisfies conditional expressions, $h \leq H \leq h+(R/\tan(\theta/2))$ and $Ravg<S<5Ravg$, where h is a height from a field angle origin of the imaging module to the substrate, H is a height of the light shielding element at a measurement position, R is a distance from a center of the imaging module to the measurement position, $\theta$ is an angle of a field angle of the imaging module, Ravg is an average value of distances from the center to measurement positions of the light shielding element, and S is a distance from the center to a center of the light emitting element.

19 Claims, 8 Drawing Sheets

OPTICAL FINGERPRINT IMAGING DEVICE

CROSS-REFERENCE TO RELATED APPLICATION

This application claims the priority benefit of U.S. provisional application Ser. No. 63/281,092, filed on Nov. 19, 2021. The entirety of the above-mentioned patent application is hereby incorporated by reference herein and made a part of this specification.

BACKGROUND

Technical Field

The disclosure relates to a sensing device, and more particularly to an optical fingerprint imaging device.

Description of Related Art

Nowadays, the biometric device is closely related to our daily life, replaces the cumbersome process of password input and the inconvenience of passwords being easily forgotten, and provides preferred security and convenience in fields such as security, confidentiality protection, and cash payment.

Many optical biometric devices have been developed. For example, uniform light diffusion is achieved through a periodic structure and a diffusion layer under a characteristic pressing surface, so that the fingerprint can receive uniform brightness on the pressing surface. Alternatively, light is transmitted from a bottom light source to the characteristic pressing surface using an annular light guiding structure. Alternatively, secondary excitation light is generated by a light color conversion element, and the wavelength of the light source and the wavelength of the secondary excitation light are further distinguished using a light filter element, so as to obtain a biometric image with preferred contrast.

However, the above-mentioned methods are often limited by the limited size of the mechanism, resulting in the inability to obtain biometric images with both high uniformity and high contrast. Therefore, how to reduce the occurrence of stray light spots through the arrangement of a light shielding element and a light emitting element such that a device can have a wide imaging area range in a small-sized mechanism while having high uniform brightness and high contrast is a topic to be pursued in the art.

SUMMARY

The disclosure provides an optical fingerprint imaging device, which can reduce the occurrence of stray light spots, so that the device can obtain a wide imaging area range in a small-sized mechanism while having high uniform brightness and high contrast.

The disclosure provides an optical fingerprint imaging device, which includes a substrate, an imaging module, at least one light emitting element, a light shielding element, a case, and a pressing substrate. The imaging module is disposed on the substrate. The at least one light emitting element is disposed on the substrate and surrounds the imaging module. The light shielding element is disposed on the substrate and is located between the imaging module and the at least one light emitting element. The case is disposed on an edge of the substrate and surrounds the imaging module. The pressing substrate is disposed on the case and covers the imaging module, the at least one light emitting element, and the light shielding element. The optical fingerprint imaging device satisfies conditional expressions of $h \leq H \leq h+(R/\tan(\theta/2))$ and $Ravg < S < 5Ravg$, where $h$ is a height from a field angle origin of the imaging module to the substrate, $H$ is a height of the light shielding element at a measurement position, $R$ is a distance from a center of the imaging module to the measurement position of the light shielding element in a horizontal direction, $\theta$ is an angle of a field angle of the imaging module, $Ravg$ is an average value of distances from the center of the imaging module to measurement positions of the light shielding element in the horizontal direction, and $S$ is a distance from the center of the imaging module to a center of the at least one light emitting element in the horizontal direction.

In an embodiment of the disclosure, the at least one light emitting element is a light emitting diode, a laser diode, or a vertical-cavity surface-emitting laser.

In an embodiment of the disclosure, a haze of the pressing substrate is less than 5%.

In an embodiment of the disclosure, the pressing substrate includes a color conversion layer including a medium layer and multiple color conversion materials.

In an embodiment of the disclosure, the medium layer is glass, acrylic, epoxy resin, polycarbonate, polyvinyl alcohol, polyethylene terephthalate, polyolefin, silicon, or any combination thereof.

In an embodiment of the disclosure, the color conversion materials are quantum dot materials, inorganic fluorescent powders, organic fluorescent dyes, or any combination thereof.

In an embodiment of the disclosure, the pressing substrate further includes a base layer connected to the color conversion layer, and the color conversion layer is located between the imaging module and the base layer.

In an embodiment of the disclosure, the base layer is glass, polymethyl methacrylate, polycarbonate, polyvinyl alcohol, polyethylene terephthalate, polyolefin, or any combination thereof.

In an embodiment of the disclosure, the pressing substrate further includes a filter layer connected between the color conversion layer and the base layer.

In an embodiment of the disclosure, the filter layer is a low-pass filter, a high-pass filter, or a band-pass filter.

In an embodiment of the disclosure, the light shielding element is plastic or metal, and the light shielding element is non-transparent.

In an embodiment of the disclosure, distances from a top surface of the light shielding element to the substrate are all the same.

In an embodiment of the disclosure, distances from a top surface of the light shielding element to the substrate gradually increase from adjacent to the imaging module to away from the imaging module.

In an embodiment of the disclosure, an appearance of the light shielding element in the horizontal direction is a circle, a square, or a polygon.

In an embodiment of the disclosure, the imaging module includes a sensing element, at least one optical lens, a lens barrel, and a lens holder.

In an embodiment of the disclosure, the light shielding element and the lens holder are integrally formed.

In an embodiment of the disclosure, the light shielding element, the lens barrel, and the lens holder are integrally formed.

In an embodiment of the disclosure, the case is plastic or metal.

In an embodiment of the disclosure, the case is metal, the case and the substrate have a capacitance value, and the optical fingerprint imaging device changes an activation state according to the capacitance value.

Based on the above, in the optical fingerprint imaging device of the disclosure, the light shielding element is disposed between the imaging module and the at least one light emitting element to reduce stray light spots entering the sensing element. In addition, the optical fingerprint imaging device satisfies the conditional expressions of $h \leq H \leq h+(R/\tan(\theta/2))$ and $Ravg<S<5Ravg$, where h is the height from the field angle origin of the imaging module to the substrate, H is the height of the light shielding element at the measurement position, R is the distance from the center of the imaging module to the measurement position of the light shielding element in the horizontal direction, $\theta$ is the angle of the field angle of the imaging module, Ravg is the average value of the distances from the center of the imaging module to the measurement positions of the light shielding element in the horizontal direction, and S is the distance from the center of the imaging module to the center of the light emitting element in the horizontal direction. In this way, through the arrangement of the light shielding element and the light emitting element, the occurrence of stray light spots can be reduced, so that the device can have a wide imaging area range in a small-sized mechanism while having high uniform brightness and high contrast, thereby obtaining preferable optical sensing.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
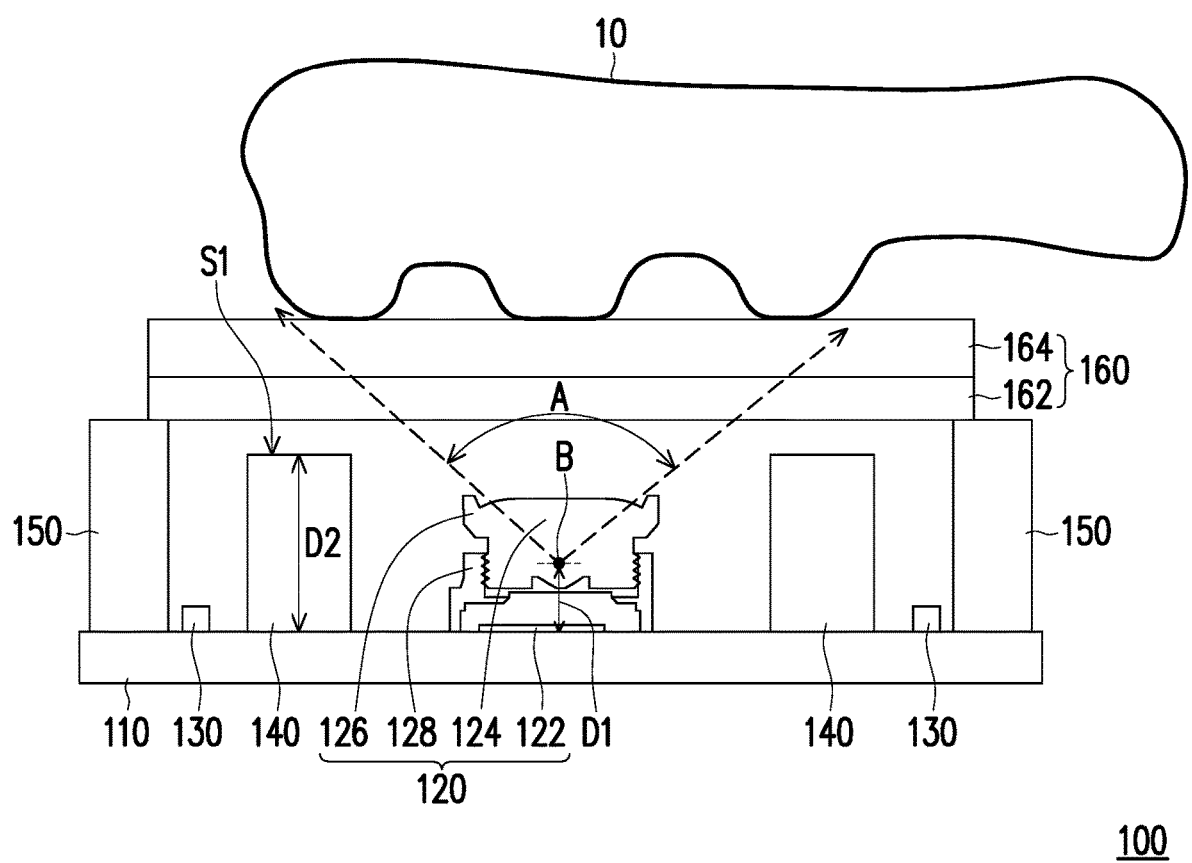
FIG. 1 is a cross-sectional schematic view of an optical fingerprint imaging device according to an embodiment of the disclosure.
Figure 2:
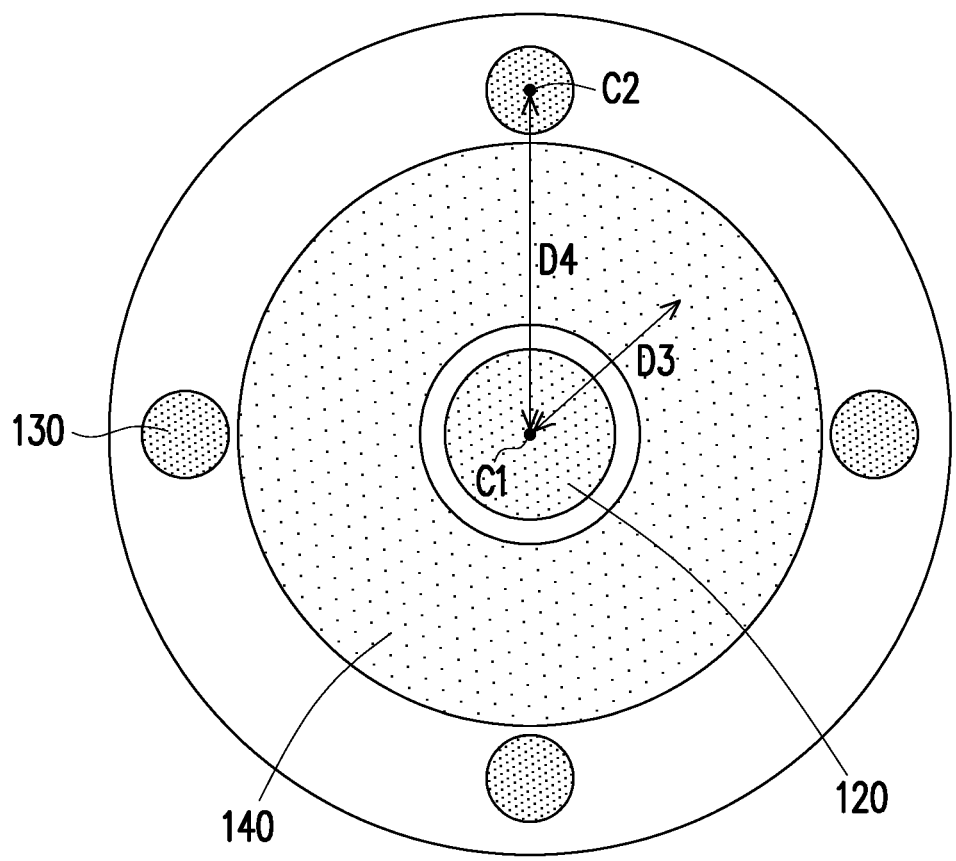
FIG. 2 is a top schematic view of the optical fingerprint imaging device of FIG. 1.
Figure 3:
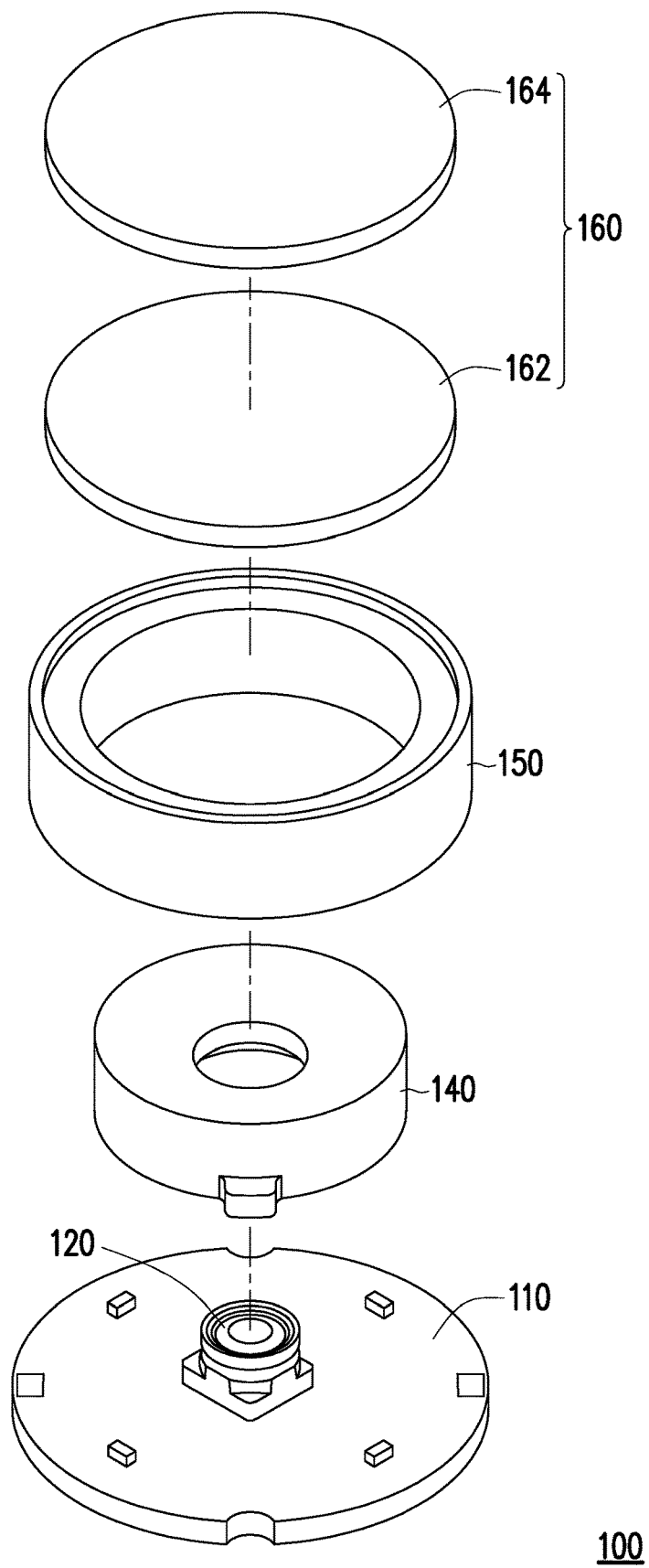
FIG. 3 is an exploded schematic view of the optical fingerprint imaging device of FIG. 1.

FIG. 1 is a cross-sectional schematic view of an optical fingerprint imaging device according to an embodiment of the disclosure. FIG. 2 is a top schematic view of the optical fingerprint imaging device of FIG. 1. FIG. 3 is an exploded schematic view of the optical fingerprint imaging device of FIG. 1. Please refer to FIG. 1 to FIG. 3. The embodiment provides an optical fingerprint imaging device 100 for sensing a finger 10 to obtain fingerprint information. The optical fingerprint imaging device 100 includes a substrate 110, an imaging module 120, at least one light emitting element 130, a light shielding element 140, a case 150, and a pressing substrate 160. The imaging module 120, the at least one light emitting element 130, the light shielding element 140, and the case 150 are all disposed on the substrate 110.

The substrate 110 is, for example, a printed circuit board (PCB), a flexible printed circuit board (FPCB), a glass carrier having a circuit, or a ceramic substrate having a circuit, but not limited thereto.

The imaging module 120 is used to capture an image of the finger 10 and has a field angle, and an angle A of the field angle is between 90 degrees and 150 degrees. Specifically, in the embodiment, the imaging module 120 includes a sensing element 122, at least one optical lens 124, a lens barrel 126, and a lens holder 128. The sensing element 122 is, for example, a charge coupled device (CCD), a complementary metal-oxide semiconductor (CMOS), or other suitable image sensing elements, but the disclosure is not limited thereto. The at least one optical lens 124 includes, for example, a combination of one or more optical lens elements having dioptric powers, such as various combinations of non-planar lens elements including bi-concave lenses, bi-convex lenses, concave-convex lenses, convex-concave lenses, plano-convex lenses, plano-concave lenses, etc., but the disclosure is not limited thereto. The lens barrel 126 is used to carry the at least one optical lens 124, and the lens barrel 126 may be fixed to the lens holder 128 by threads or other types of fixing structures. The materials of the lens barrel 126 and the lens holder 128 may be metal or plastic, but the disclosure is not limited thereto.

The at least one light emitting element 130 is disposed on the substrate 110 and surrounds the imaging module 120. The at least one light emitting element 130 is used to provide a sensing light beam to the finger 10, and the finger 10 reflects a light beam with the fingerprint information back to the imaging module 120. For example, in the embodiment, there are, for example, four light emitting elements 130, which are evenly distributed on the periphery of the imaging module 120, as shown in FIG. 2. The at least one light emitting element 130 is, for example, a light emitting diode (LED), a laser diode (LD), or a vertical-cavity surface-emitting laser (VCSEL). In addition, the provided light beam may include visible light, non-visible light, or a combination of the two, but the disclosure is not limited thereto. The non-visible light may be infrared light, but the disclosure is not limited thereto.

Figure 4A:
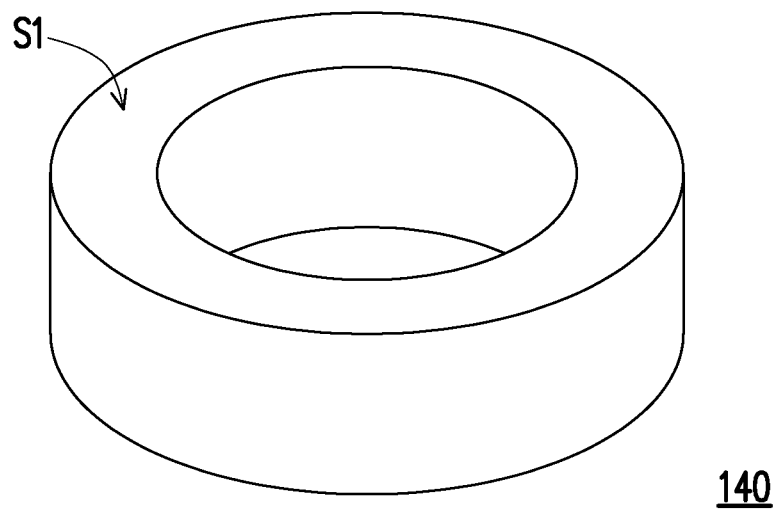
FIG. 4A and FIG. 4B are respectively schematic views of a light shielding element according to different embodiments of the disclosure.
Figure 4B:
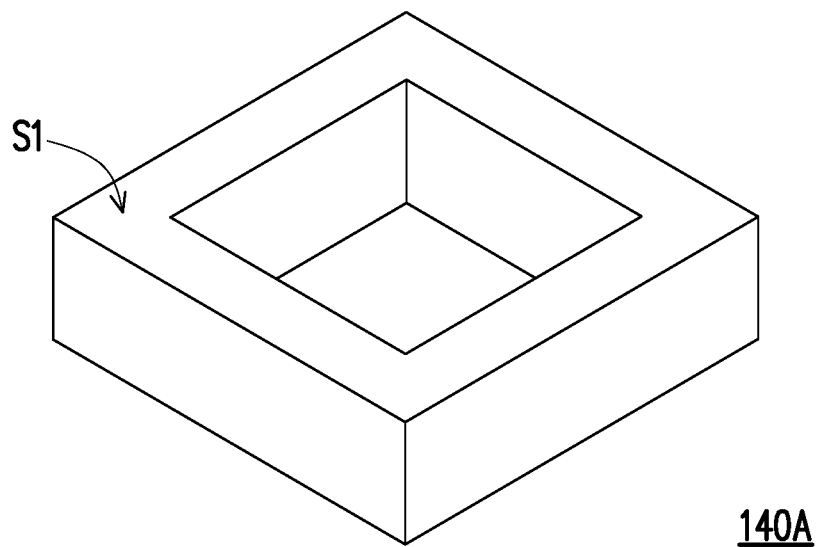

FIG. 4A and FIG. 4B are respectively schematic views of a light shielding element according to different embodiments of the disclosure. Please refer to FIG. 1 to FIG. 4A first. The light shielding element 140 shown in FIG. 4A may at least be applied to the optical fingerprint imaging device 100 of FIG. 1, so the following description takes the application of the light shielding element 140 shown in FIG. 4A to the optical fingerprint imaging device 100 of FIG. 1 as an example. The light shielding element 140 is disposed on the substrate 110 and is located between the imaging module 120 and the at least one light emitting element 130. The light shielding element 140 is used to reduce the occurrence of stray light spots, thereby improving the quality of fingerprint imaging. The light shielding element 140 is plastic or metal, and the light emitting wavelength of the light shielding element 140 to the light emitting element 130 is non-transparent. In the embodiment, distances from a top surface S1 of the light shielding element 140 to the substrate 110 are all the same, but the disclosure is not limited thereto. That is, the light shielding element 140 has the top surface S1 parallel to a horizontal direction. In addition, in the embodiment, the appearance of the light shielding element 140 in the horizontal direction is a circle. However, in different embodiments, the appearance of the light shielding element 140A in the horizontal direction is a square or another type of polygon, as shown in FIG. 4B, but the disclosure is not limited thereto.

Please continue to refer to FIG. 1 to FIG. 3. The case 150 is disposed on the edge of the substrate 110 and surrounds the imaging module 120, wherein the light emitting element 130 is located between the imaging module 120 and the case 150. The case 150 is, for example, plastic or metal, and is used to support the pressing substrate 160 disposed thereon and dustproof internal components. In an embodiment, the material of the case 150 is metal, so that the case 150 and the substrate 110 have a capacitance value, such that the optical fingerprint imaging device 110 may change an activation state according to the magnitude of or changes in the capacitance value.

Figure 5A:
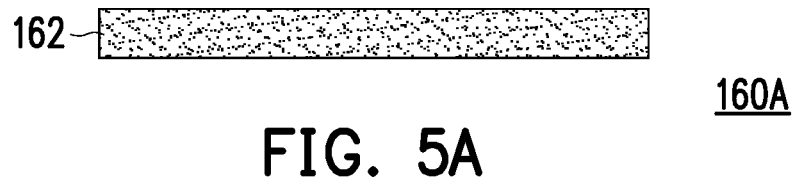
FIG. 5A to FIG. 5C are respectively schematic views of a pressing substrate according to different embodiments of the disclosure.
Figure 5B:
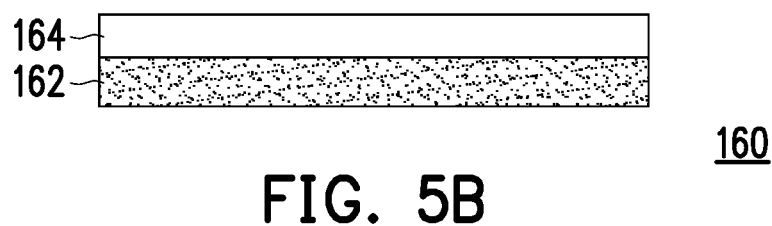
Figure 5C:
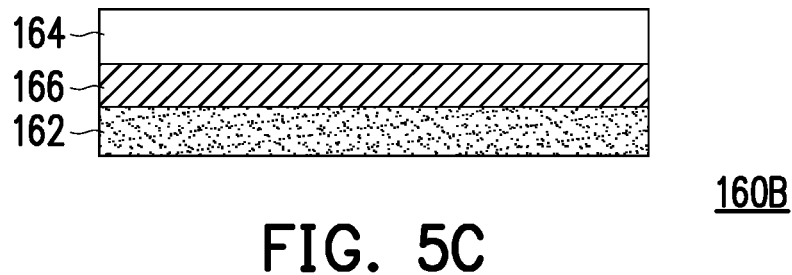

FIG. 5A to FIG. 5C are respectively schematic views of a pressing substrate according to different embodiments of the disclosure. Please refer to FIG. 1 to FIG. 3 and FIG. 5A to FIG. 5C first. The pressing substrate 160 is disposed on the case 150 and covers the imaging module 120, the at least one light emitting element 130, and the light shielding element 140. The pressing substrate 160 is used to allow the finger 10 to be pressed against, so that the distance from the finger 10 to the imaging module 120 is fixed. In the embodiment, the haze of the pressing substrate 160 is less than 5%. In an embodiment, a pressing substrate 160A includes a color conversion layer 162 for changing the wavelength of the light emitting element 130 beam. In detail, the color conversion layer 162 includes a medium layer (not shown) and multiple color conversion materials (not shown) evenly dispersed in the medium layer. The medium layer is glass, acrylic, epoxy resin, polycarbonate, polyvinyl alcohol, polyethylene terephthalate, polyolefin, silicon, or any combination thereof, and the color conversion materials are quantum dot materials, inorganic fluorescent powders, organic fluorescent dyes, or any combination thereof. In another embodiment, the pressing substrate 160A may also directly replace the color conversion layer 162 with the medium layer to form a transparent plate, but the disclosure is not limited thereto.

In the embodiment, the pressing substrate 160 includes the color conversion layer 162 and a base layer 164 connected to the color conversion layer 162, and the base layer 164 is used to improve the reliability of the pressing substrate 160. The color conversion layer 162 is located between the imaging module 120 and the base layer 164. For example, the base layer 164 is glass, polymethyl methacrylate, polycarbonate, polyvinyl alcohol, polyethylene terephthalate, polyolefin, or any combination thereof, but the disclosure is not limited thereto. In yet another embodiment, a pressing substrate 160B may further include a filter layer 166 connected between the color conversion layer 162 and the base layer 164. The filter layer 166 is used to filter out light rays with a specific wavelength, thereby improving the fingerprint imaging quality of the optical fingerprint imaging device 100. For example, the filter layer 166 is a low-pass filter, a high-pass filter, or a band-pass filter and may be made into a different type of filter such as a reflection filter or an absorption filter, but the disclosure is not limited thereto.

Please continue to refer to FIG. 1 to FIG. 3. It is worth mentioning that in the embodiment, the optical fingerprint imaging device 100 satisfies conditional expressions of $h \leq H \leq h+(R/\tan(\theta/2))$ and $Ravg<S<5Ravg$, where h is a height D1 from a field angle origin B of the imaging module 120 to the substrate 110, H is the height of the light shielding element 140 at a measurement position (that is, in the light shielding element 140, a distance D2 from the top surface S1 to the substrate 110), R is a distance D3 from a center C1 of the imaging module 120 to the measurement position of the light shielding element 140 in the horizontal direction, $\theta$ is the angle A of the field angle of the imaging module 120, Ravg is the average value of the distances D3 from the center C1 of the imaging module 120 to the measurement positions of the light shielding element 140 in the horizontal direction, and S is a distance D4 from the center C1 of the imaging module 120 to a center C2 of the light emitting element 130 in the horizontal direction, wherein the measurement positions in the different parameter definitions are the same position. In this way, through the arrangement of the light shielding element 140 and the light emitting element 130, the occurrence of stray light spots can be reduced, so that the device can have a wide imaging area range in a small-sized mechanism while having high uniform brightness and high contrast, thereby obtaining preferable optical sensing.

Figure 6:
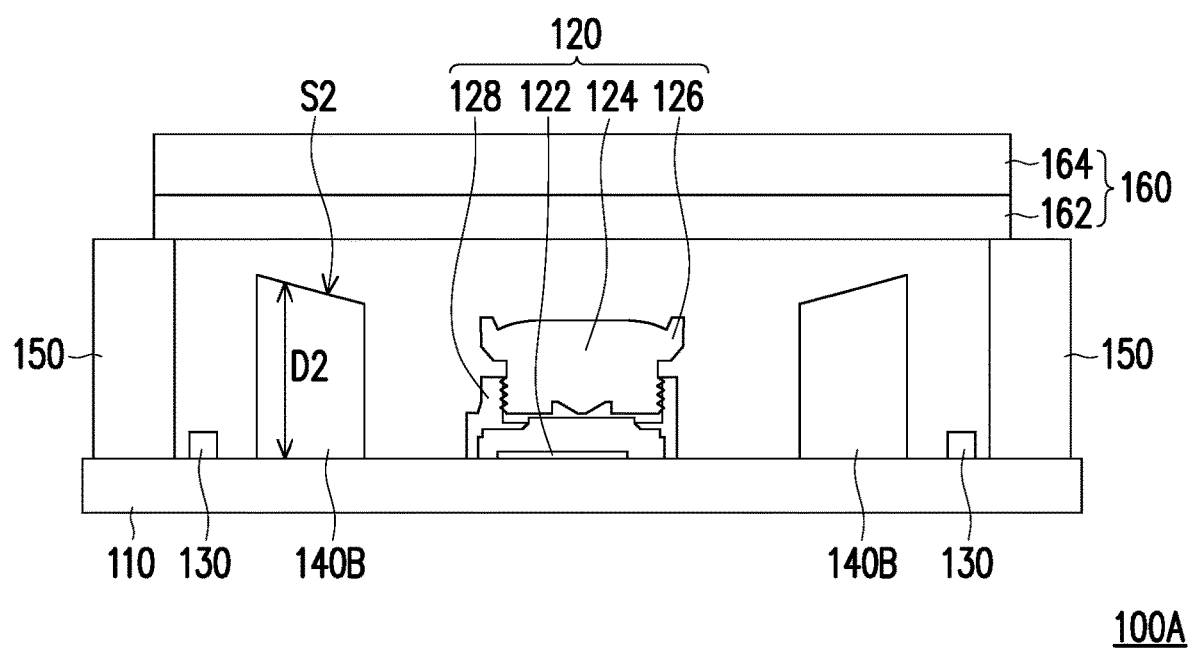
FIG. 6 is a cross-sectional schematic view of an optical fingerprint imaging device according to another embodiment of the disclosure.
Figure 7A:
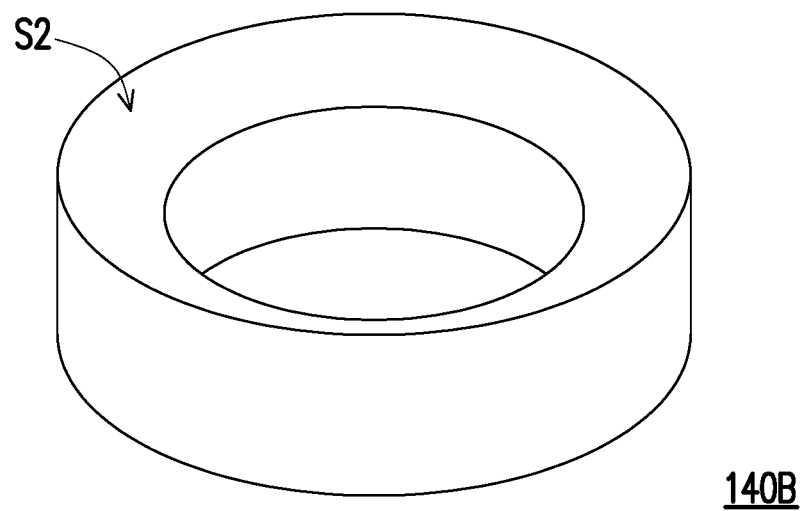
FIG. 7A and FIG. 7B are respectively schematic views of a light shielding element according to different embodiments of the disclosure.
Figure 7B:
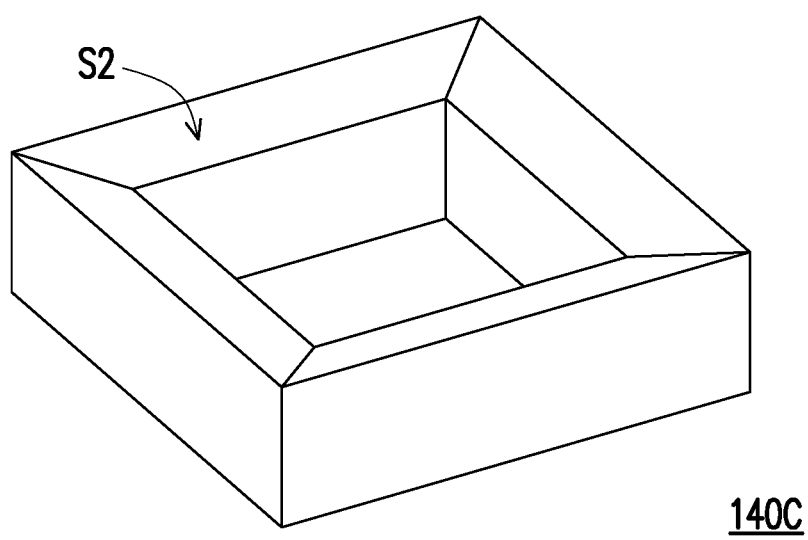

FIG. 6 is a cross-sectional schematic view of an optical fingerprint imaging device according to another embodiment of the disclosure. FIG. 7A and FIG. 7B are respectively schematic views of a light shielding element according to different embodiments of the disclosure. Please refer to FIG. 6 to FIG. 7B. An optical fingerprint imaging device 100A of the embodiment is similar to the optical fingerprint imaging device 100 shown in FIG. 1. The difference between the two is that in the embodiment, the distances D2 from a top surface S2 of a light shielding element 140B to the substrate 110 gradually increase from adjacent to the imaging module 120 to away from the imaging module 120. In this way, the material can be further saved and the fingerprint imaging quality of the optical fingerprint imaging device 100 can be improved. Similar to the embodiment shown in FIG. 4A and FIG. 4B, the appearance of the light shielding element 140B of the embodiment in the horizontal direction is a circle, as shown in FIG. 7A. However, in different embodiments, the appearance of a light shielding element 140C in the horizontal direction is a square or another type of polygon, as shown in FIG. 7B, but the disclosure is not limited thereto.

Figure 8:
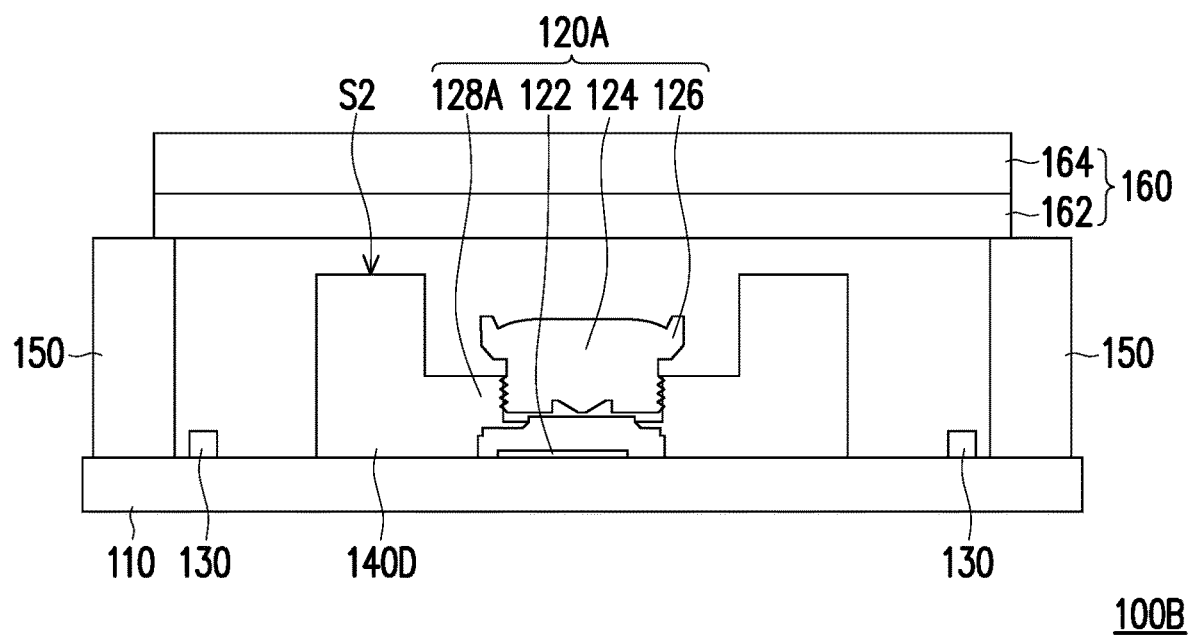
FIG. 8 is a cross-sectional schematic view of an optical fingerprint imaging device according to another embodiment of the disclosure.

FIG. 8 is a cross-sectional schematic view of an optical fingerprint imaging device according to another embodiment of the disclosure. Please refer to FIG. 8. An optical fingerprint imaging device 100B of the embodiment is similar to the optical fingerprint imaging device 100 shown in FIG. 1. The difference between the two is that in the embodiment, a light shielding element 140D and a lens holder 128A in an imaging module 120A are integrally formed. Besides, similar to the light shielding element 140 shown in FIG. 1, the light shielding element 140D has the top surface S1 parallel to the horizontal direction. In this way, the material can be further saved and the reliability of the optical fingerprint imaging device 100B can be increased.

Figure 9:
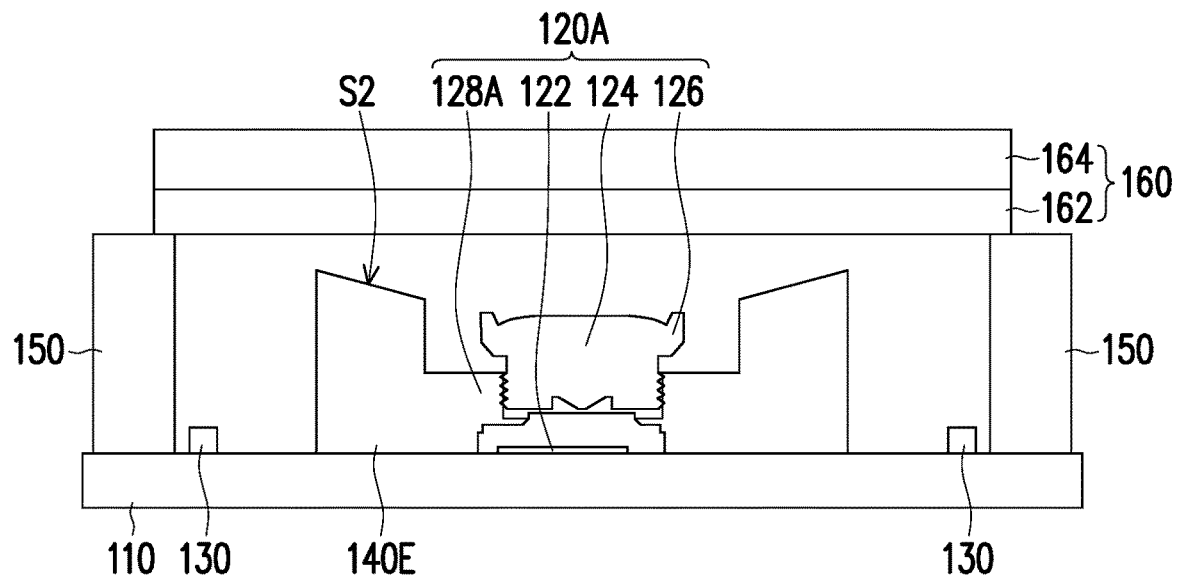
FIG. 9 is a cross-sectional schematic view of an optical fingerprint imaging device according to another embodiment of the disclosure.

FIG. 9 is a cross-sectional schematic view of an optical fingerprint imaging device according to another embodiment of the disclosure. Please refer to FIG. 9. An optical fingerprint imaging device 100C of the embodiment is similar to the optical fingerprint imaging device 100 shown in FIG. 1. The difference between the two is that in the embodiment, a light shielding element 140E and the lens holder 128A in the imaging module 120A are integrally formed. Besides, similar to the light shielding element 140B shown in FIG. 6, distances from the top surface S2 of the light shielding element 140E to the substrate 110 gradually increase from adjacent to the imaging module 120A to away from the imaging module 120A. In this way, the material can be further saved and the fingerprint imaging quality of the optical fingerprint imaging device 100C can be improved. In addition, the material can be further saved and the reliability of the optical fingerprint imaging device 100C can be increased.

In summary, in the optical fingerprint imaging device of the disclosure, the light shielding element is disposed between the imaging module and the at least one light emitting element to reduce stray light spots entering the sensing element. In addition, the optical fingerprint imaging device satisfies the conditional expressions of $h \le H \le h+(R/\tan(\theta/2))$ and $Ravg<S<5Ravg$, where h is the height from the field angle origin of the imaging module to the substrate, H is the height of the light shielding element at the measurement position, R is the distance from the center of the imaging module to the measurement position of the light shielding element in the horizontal direction, $\theta$ is the angle of the field angle of the imaging module, Ravg is the average value of the distances from the center of the imaging module to the measurement positions of the light shielding element in the horizontal direction, and S is the distance from the center of the imaging module to the center of the light emitting element in the horizontal direction. In this way, through the arrangement of the light shielding element and the light emitting element, the occurrence of stray light spots can be reduced, so that the device can have a wide imaging area range in a small-sized mechanism while having high uniform brightness and high contrast, thereby obtaining preferable optical sensing.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. An optical fingerprint imaging device, comprising:
a substrate;
an imaging module, disposed on the substrate;
at least one light emitting element, disposed on the substrate and surrounding the imaging module;
a light shielding element, disposed on the substrate and located between the imaging module and the at least one light emitting element;
a case, disposed on an edge of the substrate and surrounding the imaging module; and
a pressing substrate, disposed on the case and covering the imaging module, the at least one light emitting element, and the light shielding element, wherein the optical fingerprint imaging device satisfies conditional expressions of $h \le H \le h+(R/\tan(\theta/2))$ and $Ravg<S<5Ravg$, where h is a height from a field angle origin of the imaging module to an intersection in the imaging module to the substrate, H is a height of the light shielding element at a measurement position, R is a distance from a center of the imaging module to the measurement position of the light shielding element in a horizontal direction, $\theta$ is an angle of a field angle of the imaging module, Ravg is an average value of distances from the center of the imaging module to measurement positions of the light shielding element in the horizontal direction, and S is a distance from the center of the imaging module to a center of the at least one light emitting element in the horizontal direction.

2. The optical fingerprint imaging device according to claim 1, wherein the at least one light emitting element is a light emitting diode, a laser diode, or a vertical-cavity surface-emitting laser.

3. The optical fingerprint imaging device according to claim 1, wherein a haze of the pressing substrate is less than 5%.

4. The optical fingerprint imaging device according to claim 1, wherein the pressing substrate comprises a color conversion layer comprising a medium layer and a plurality of color conversion materials.

5. The optical fingerprint imaging device according to claim 4, wherein the medium layer is glass, acrylic, epoxy resin, polycarbonate, polyvinyl alcohol, polyethylene terephthalate, polyolefin, silicon, or any combination thereof.

6. The optical fingerprint imaging device according to claim 4, wherein the color conversion materials are quantum dot materials, inorganic fluorescent powders, organic fluorescent dyes, or any combination thereof.

7. The optical fingerprint imaging device according to claim 4, wherein the pressing substrate further comprises a base layer connected to the color conversion layer, and the color conversion layer is located between the imaging module and the base layer.

8. The optical fingerprint imaging device according to claim 7, wherein the base layer is glass, polymethyl methacrylate, polycarbonate, polyvinyl alcohol, polyethylene terephthalate, polyolefin, or any combination thereof.

9. The optical fingerprint imaging device according to claim 7, wherein the pressing substrate further comprises a filter layer connected between the color conversion layer and the base layer.

10. The optical fingerprint imaging device according to claim 9, wherein the filter layer is a low-pass filter, a high-pass filter, or a band-pass filter.

11. The optical fingerprint imaging device according to claim 1, wherein the light shielding element is plastic or metal, and a light emitting wavelength of the light shielding element to the light emitting element is non-transparent.

12. The optical fingerprint imaging device according to claim 1, wherein distances from a top surface of the light shielding element to the substrate are all the same.

13. The optical fingerprint imaging device according to claim 1, wherein distances from a top surface of the light shielding element to the substrate gradually increase from adjacent to the imaging module to away from the imaging module.

14. The optical fingerprint imaging device according to claim 1, wherein an appearance of the light shielding element in the horizontal direction is a circle, a square, or a polygon.

15. The optical fingerprint imaging device according to claim 1, wherein the imaging module comprises a sensing element, at least one optical lens, a lens barrel, and a lens holder.

16. The optical fingerprint imaging device according to claim 15, wherein the light shielding element and the lens holder are integrally formed.

17. The optical fingerprint imaging device according to claim 15, wherein the light shielding element, the lens barrel, and the lens holder are integrally formed.

18. The optical fingerprint imaging device according to claim 1, wherein the case is plastic or metal.

19. The optical fingerprint imaging device according to claim 1, wherein the case is metal, the case and the substrate have a capacitance value, and the optical fingerprint imaging device changes an activation state according to the capacitance value.

* * * * *